(12) United States Patent
Lee et al.

(10) Patent No.: US 11,352,004 B2
(45) Date of Patent: Jun. 7, 2022

(54) VEHICLE TRAVEL CONTROL SYSTEM AND CONTROL METHOD THEREFOR

(71) Applicants: HYUNDAI MOTOR COMPANY, Seoul (KR); KIA MOTORS CORPORATION, Seoul (KR)

(72) Inventors: Jason Lee, Ann Arbor, MI (US); Jinho Ha, Seoul (KR); Byungho Lee, Saline, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 263 days.

(21) Appl. No.: 16/703,490

(22) Filed: Dec. 4, 2019

(65) Prior Publication Data

US 2021/0171030 A1   Jun. 10, 2021

(51) Int. Cl.
*B60W 30/14*   (2006.01)
*B60W 10/04*   (2006.01)
(Continued)

(52) U.S. Cl.
CPC .......... *B60W 30/146* (2013.01); *B60W 10/04* (2013.01); *B60W 30/18027* (2013.01);
(Continued)

(58) Field of Classification Search
CPC ......... B60W 2540/10; B60W 2540/12; B60W 30/143; B60W 30/146; B60W 30/18027; B60W 10/04; B60W 2720/103; B60W 2720/106; B60W 2554/802; B60W 2554/804; B60W 2552/15; B60W 2552/30; B60W 2556/50; H04W 4/023; H04W 4/027; H04W 4/40; G01S 19/13
(Continued)

(56) References Cited

U.S. PATENT DOCUMENTS 6,370,470 B1 * 4/2002 Yamamura ............ B60W 30/16
                                                          701/91
9,050,982 B2    6/2015 Pietron et al.
(Continued)

FOREIGN PATENT DOCUMENTS

FR    3092549 A1 *  8/2020 ............ B60W 30/12
FR    3092550 A1 *  8/2020 .......... B60W 30/162
(Continued)

*Primary Examiner* — Atul Trivedi
(74) *Attorney, Agent, or Firm* — Lempia Summerfield Katz LLC

(57) ABSTRACT

A vehicle travel control system for a vehicle may include: a launch profile generator to generate a target torque profile or a target speed profile based on monitored driving information of a host vehicle and a target vehicle; and a controller to control a speed or an acceleration of the host vehicle based on the generated profile. In particular, the launch profile generator analyzes an intention of a driver of the host vehicle when the driver intervenes at least one of the speed, acceleration or deceleration of the host vehicle being controlled, and the launch profile generator further revises the target torque profile or the target speed profile when the analyzed intention represents preferences of the driver such that the controller controls the host vehicle based on the revised profile.

14 Claims, 11 Drawing Sheets

(51) Int. Cl.
  *B60W 30/18*     (2012.01)
  *H04W 4/40*      (2018.01)
  *G01S 19/13*     (2010.01)

(52) U.S. Cl.
  CPC .......... *H04W 4/40* (2018.02); *B60W 2540/10* (2013.01); *B60W 2552/15* (2020.02); *B60W 2552/30* (2020.02); *B60W 2554/804* (2020.02); *B60W 2720/106* (2013.01); *G01S 19/13* (2013.01)

(58) Field of Classification Search
  USPC .......................................................... 701/36
  See application file for complete search history.

(56) References Cited

U.S. PATENT DOCUMENTS

| | | | |
|---|---|---|---|
| 9,061,630 B2 | 6/2015 | Takiguchi et al. | |
| 10,034,630 B2 | 7/2018 | Lee et al. | |
| 2011/0190972 A1* | 8/2011 | Timmons | G01C 21/34 701/31.4 |
| 2014/0012479 A1 | 1/2014 | Zhao | |
| 2015/0307099 A1* | 10/2015 | Dextreit | B60W 30/18127 180/65.265 |
| 2016/0001781 A1* | 1/2016 | Fung | G16H 50/20 701/36 |
| 2016/0297435 A1* | 10/2016 | D'Amato | B60W 30/143 |
| 2016/0297438 A1* | 10/2016 | Han | B60W 60/001 |
| 2017/0080931 A1* | 3/2017 | D'Amato | B60W 30/18072 |
| 2017/0355368 A1* | 12/2017 | O'Dea | B60W 30/14 |
| 2018/0001892 A1* | 1/2018 | Kim | B60W 30/16 |
| 2018/0050697 A1* | 2/2018 | Kuszmaul | G01S 13/93 |
| 2018/0134291 A1* | 5/2018 | Burford | B60K 31/00 |
| 2019/0100209 A1* | 4/2019 | Plianos | B60W 30/18072 |
| 2019/0232965 A1* | 8/2019 | Watanabe | B60W 40/076 |
| 2019/0232970 A1* | 8/2019 | Watanabe | G08G 1/16 |
| 2019/0345887 A1* | 11/2019 | Aoki | B60W 50/12 |
| 2019/0351891 A1* | 11/2019 | Zhang | B60W 30/143 |
| 2019/0373419 A1* | 12/2019 | Bayley | H04W 4/46 |
| 2020/0257304 A1* | 8/2020 | Moshchuk | G05D 1/0278 |
| 2020/0282990 A1* | 9/2020 | Sato | B60W 30/12 |
| 2021/0046951 A1* | 2/2021 | Kim | B60W 50/0097 |
| 2021/0146785 A1* | 5/2021 | Wang | B60L 50/60 |
| 2021/0171038 A1* | 6/2021 | Lee | B60W 30/18109 |
| 2021/0213932 A1* | 7/2021 | Aggoune | B60W 30/16 |
| 2021/0253097 A1* | 8/2021 | Lacaze | G08G 1/096791 |

FOREIGN PATENT DOCUMENTS

| | | | | |
|---|---|---|---|---|
| FR | 3093056 A1 | * | 8/2020 | ............ B60W 10/20 |
| GB | 2511899 A | * | 9/2014 | ............... B60K 6/48 |
| GB | 2523198 A | * | 8/2015 | ............. B60K 28/04 |
| GB | 2526143 A | * | 11/2015 | ......... B60K 31/0058 |
| GB | 2537926 A | * | 11/2016 | .......... B60W 30/143 |
| GB | 2537929 A | * | 11/2016 | .......... B60W 30/143 |
| GB | 2537952 A | * | 11/2016 | ............. B60K 31/00 |
| KR | 10-2012-0128423 A | | 11/2012 | |
| WO | WO-2008012160 A1 | * | 1/2008 | ................ B60T 7/22 |
| WO | WO-2014145918 A1 | * | 9/2014 | ......... B60R 16/0231 |
| WO | WO-2015059235 A2 | * | 4/2015 | ......... B60W 30/143 |
| WO | WO-2016168213 A2 | * | 10/2016 | ......... B60K 31/0058 |

* cited by examiner

VEHICLE TRAVEL CONTROL SYSTEM AND CONTROL METHOD THEREFOR

FIELD

The present disclosure relates to a system to control driving of a vehicle, and a method for the same, and more particularly to a technology of adjusting acceleration and deceleration of the vehicle.

BACKGROUND

The statements in this section merely provide background information related to the present disclosure and may not constitute prior art.

The Auto-industry has strived for developing various technologies and systems to provide a driver with safe and comfortable driving environment. Various functions, such as an adaptive cruise control (ACC) and a cooperative adaptive cruise control (CACC), have been developed to assist a driver in driving a vehicle. The ACC system assists the driver with automatically maintaining a predetermined distance (e.g., an inter-vehicle distance) or a predetermined speed based on driving information of a host vehicle and a proceeding vehicle (e.g., a target vehicle), so as to follow the proceeding vehicle.

For example, as illustrated in FIG. 1, the ACC system for a host vehicle is capable of operating in at least two modes: a Cruise mode in which the speed of the host vehicle 3 is controlled to maintain a set speed; and a Follow mode in which the speed of the vehicle 3 is controlled to maintain a set distance from the preceding (target) vehicle 5. The ACC system provides a user setting menu (USM) for a driver to select a desired menu.

As communication technologies have been developed for wireless exchange of data between vehicles and road infrastructure such as V2I (a vehicle-to-infrastructure) and between vehicles (e.g., a vehicle-to-vehicle (V2V)), the host vehicle may receive a speed limit of a road and driving information of the preceding vehicle driving on the same road as the host vehicle. The CACC utilizes such V2V and/or V2I (collectively V2X) communication technologies to improve the cruise control performance. For example, the received speed limit of the road and driving information of the preceding vehicle may limit the maximum set speed and/or the set distance in the Cruise mode and the Follow mode.

However, we have discovered that the driver's distance and speed setting to follow a target vehicle is not enough to satisfy the driver's driving style and preferences.

SUMMARY

The present disclosure provides a vehicle travel control system that enables an intervening action of a user during an adaptive cruise control to be used to improve the controlled driving and thus provides a customized speed and braking performance based on the user's preference.

In one form of the present disclosure, the vehicle travel control system for a vehicle may include: at least one sensor that monitors vehicle driving conditions of a host vehicle and a target vehicle and produces a sensor signal representative of the monitored vehicle driving conditions; a launch profile generator configured to: receive the monitored vehicle driving conditions, and generate at least one of a target torque profile, or a target speed profile of the host vehicle based on the monitored vehicle driving conditions; and a controller configured to: receive at least one of the generated target torque profile or target speed profile of the host vehicle from the launch profile generator, and control at least one of a speed or an acceleration of the host vehicle based on at least one of the generated target torque profile or target speed profile.

The vehicle driving conditions may include a distance between the host vehicle and the target vehicle and a relative speed between the host vehicle and the target vehicle. And the launch profile generator is further configured to: analyze an intention of a driver of the host vehicle when the driver intervenes at least one of the speed or acceleration of the host vehicle being controlled, and revise at least one of the generated target torque profile or target speed profile when the analyzed intention represents preferences of the driver.

In another form, the vehicle driving conditions further includes at least one of a speed of the target vehicle, a road curvature and a road grade of a road on which the host vehicle is traveling, traffic information of the road received via vehicle-to-everything (V2X) communicator of the host vehicle, or positions of the host and target vehicles via a global positioning system (GPS) receiver of the host vehicle. The launch profile generator may include: a drive situation analyzer to provide the launch profile generator with at least one of a pre-stored speed profile or a pre-stored torque profile, based on the monitored vehicle driving conditions.

When the launch profile generator receives the at least one of the pre-stored speed profile or pre-stored torque profile, the launch profile generator is configured to generate the target torque profile or the target speed profile based on the at least one of the pre-stored target torque profile or the pre-stored target speed profile, and the monitored driving conditions.

In other form, the launch profile generator includes a driver input analyzer configured to receive a pedal input corresponding to a degree of an acceleration operated by the driver and configured to analyze the intention of the driver based on the received pedal input.

In one form, when the driver intervenes the at least one of the speed or acceleration of the host vehicle, the controller may determine whether an emergency situation of the target vehicle causes the driver intervention based on a change to the at least one of the distance between the host vehicle and the target vehicle or the relative speed therebetween so as to determine whether to revise the at least one of the target torque profile or the target speed profile based on the analyzed intention.

In other form of the present disclosure, a method for controlling driving of a vehicle is provided. The method may include: monitoring, by at least one sensor, driving conditions of a host vehicle and a target vehicle, where the driving conditions includes at least one of a distance between the host vehicle and the target vehicle or a relative speed between the host vehicle and the target vehicle; generating, by a launch profile generator, based on driving conditions, at least one of a target torque profile or a target speed profile of the host vehicle; controlling, by a controller, at least one of a speed or an acceleration of the host vehicle based on at least one of the target torque profile or target speed profile; analyzing, by the launch profile generator, an intention of a driver of the host vehicle when the driver intervenes at least one of the speed or acceleration of the host vehicle being controlled; revising, by the launch profile generator, at least one of the target torque profile or target speed profile when the analyzed intention represents preferences of the driver; and controlling, by the controller, at least one of the speed or acceleration of the host vehicle based on at least one of the revised target torque profile or target speed profile.

In another form, the method may further include: monitoring, by at least one sensor, driving conditions of a host vehicle and a target vehicle, where the driving conditions includes at least one of a distance between the host vehicle and the target vehicle or a relative speed between the host vehicle and the target vehicle; generating, by a launch profile generator, based on driving conditions, at least one of a target torque profile or a target speed profile of the host vehicle; controlling, by a controller, at least one of a speed, or an acceleration of the host vehicle based on at least one of the target torque profile, or the target speed profile; analyzing, by the launch profile generator, an intention of a driver of the host vehicle when the driver intervenes at least one of the speed or acceleration of the host vehicle being controlled; revising, by the launch profile generator, at least one of the target torque profile or the target speed profile when the analyzed intention represents preferences of the driver; and controlling, by the controller, at least one of the speed or the acceleration of the host vehicle based on at least one of the revised target torque profile or target speed profile.

In other form, the method may include steps of: determining, by the controller, whether the host vehicle starts to move after a stop based on the monitored driving conditions; determining, by the controller when the host vehicle starts to move after a stop, whether an adaptive cruise control (ACC) function is on; recording, when the ACC function is off, a speed profile of the host vehicle until the host vehicle makes another stop; comparing, by the launch profile generator, the recorded speed profile with the target speed profile of the host vehicle; and revising the target speed profile when a deviation between the recorded speed profile and target speed profile is greater than a predetermined range.

When the ACC function is on and an acceleration signal is received, the launch profile generator performs steps of: recording a speed profile of the host vehicle until a launch phase of the host vehicle ends; comparing the recorded speed profile with the target speed profile of the host vehicle; and revising the target speed profile when a deviation between the recorded speed profile and target speed profile is greater than a predetermined range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
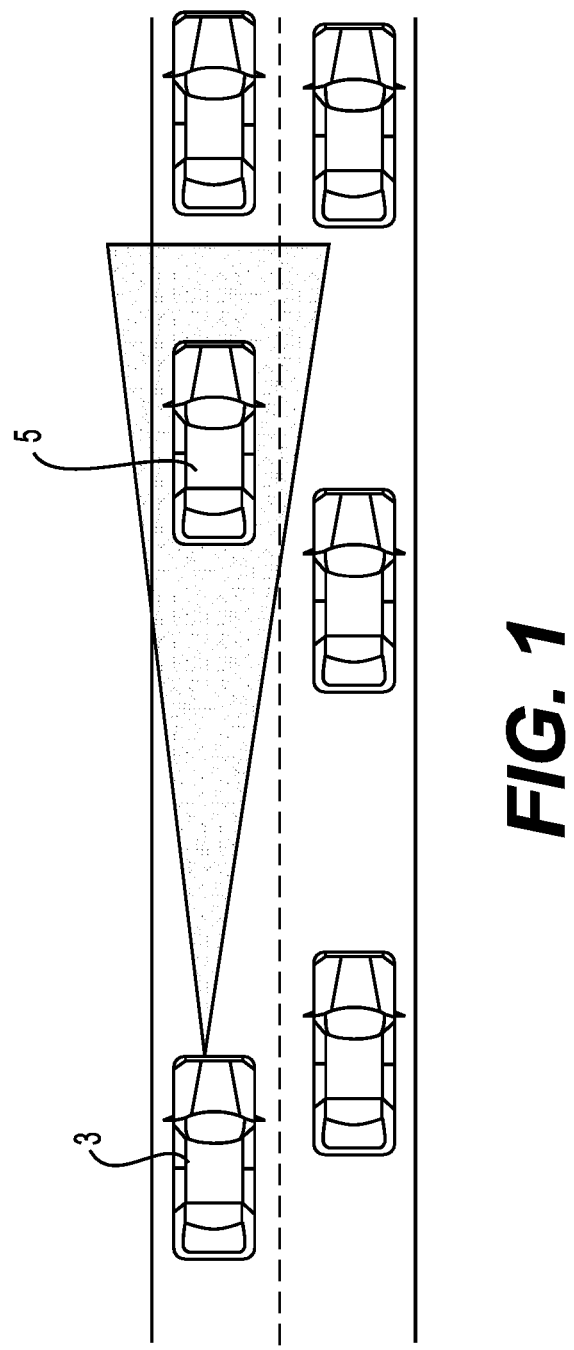
FIG. 1 illustrates a host vehicle following a target vehicle when an adaptive cruise control operates.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding the reference numerals to the components of each drawing, it should be noted that the identical or equivalent component is designated by the identical numeral even when they are displayed on other drawings. Further, in describing exemplary forms of the present disclosure, a detailed description of well-known features or functions will be ruled out in order not to unnecessarily obscure the gist of the present disclosure.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Also, the terms, such as "unit," "module," "profile generator," "mode analyzer," "commander," or "calculator" etc., should be understood as a unit that processes at least one function or operation and that may be embodied in a hardware manner (e.g., a processor), a software manner, or a combination of the hardware manner and the software manner. A controller may be implemented by at least one processor operated by a setting program, in which the setting program includes a series of commands for performing each step included in a controlling method according to the present disclosure to be described below.

Figure 2:
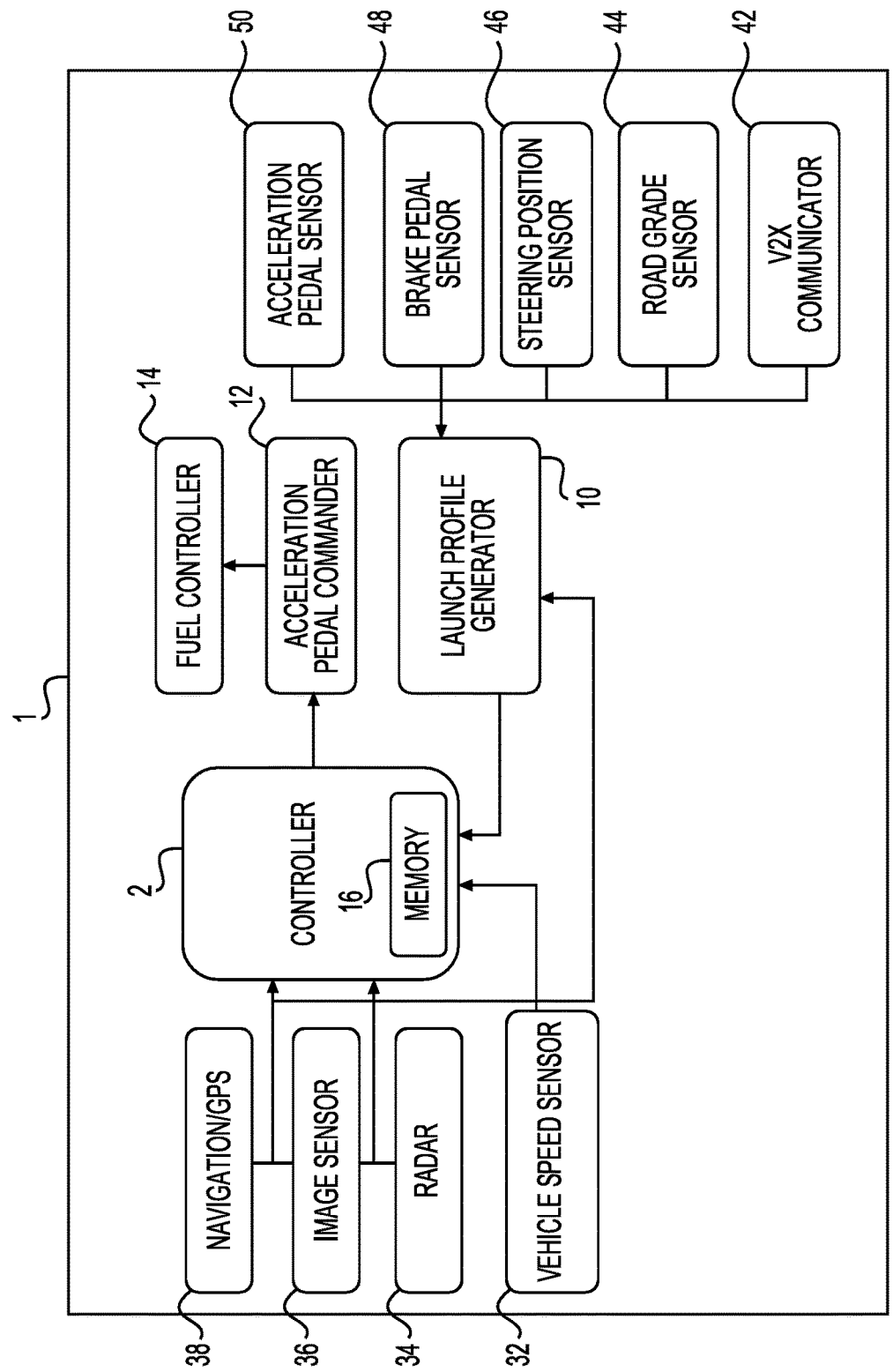
FIG. 2 is a block diagram illustrating components of a vehicle travel control system for a vehicle in one form.

Hereinafter, exemplary forms of the present disclosure will be described in detail with reference to FIGS. 1 to 15. FIG. 2 is a block diagram illustrating components of a vehicle travel control system 1 for a vehicle 3 in one form of the present disclosure. The vehicle travel control system 1 may include: various sensors (32, 34, 36, 38, 42, 44, 46, 48, 50) to monitor vehicle driving conditions of a host vehicle 3 and a target vehicle 5 (in FIG. 1) and produce sensor signals representative of the monitored vehicle driving conditions; a launch profile generator 10 configured to generate at least one of a target torque profile or a target speed profile of the host vehicle based on the monitored vehicle driving conditions; and a controller 2 configured to receive at least one of the generated target torque profile or target speed profile of the host vehicle from the launch profile generator 10 and configured to control at least one of a speed or an acceleration of the host vehicle based on at least one of the generated target torque profile or target speed profile. In one form, the controller 2 and the launch profile generator 10 may be integrated into one unit.

Certain words and terms used in the present disclosure will be recognized by those skilled in the art and are intended to be accorded their plain and ordinary meanings. Further, to facilitate explanation of the disclosed subject matter, the following terms as used in the present disclosure have meanings as set forth in the following paragraph:

Profile—when herein used in the context of a physical quantity, e.g., "torque profile," "pressure profile," "speed profile," refers to a set of values, e.g., that may be plotted on a graph or stored in a memory, of the physical quantity, each of the values pertaining to a moment in time, e.g., having a time index.

Here, a memory 16 may also store an algorithm for calculating the target torque profile, braking pressure profile, and/or target speed profile, and a profile calculator 110 executes the algorithm. The memory 16 may be a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and an optical disk-type memory.

The various sensors to monitor the vehicle driving conditions of the host vehicle 3 and the target vehicle 5 (e.g., a preceding vehicle) may include: a speed sensor 32 to sense a speed of a vehicle, a radar sensor 34 to collect surrounding information of a vehicle (e.g., a presence of a surrounding vehicle, a speed and distance between two vehicles etc.), an image sensor 36 (e.g., a camera to photograph a surrounding vehicle or objects) to take an image and send image data, and a navigation unit or a global positioning system (GPS) unit 38 which includes a GPS receiver to receive a position of a vehicle. The signals representative of respectively detected driving conditions (e.g., a vehicle speed, a distance between two vehicles, image data, position information etc.) by the various sensors are sent to the controller 2 and the launch profile generator 10 to calculate the target torque profile, and/or target speed profile of the host vehicle.

In one form, the vehicle travel control system 1 may also include a vehicle-to-everything (V2X) communicator 42 to receive traffic information and position information of a remote vehicle (e.g., target vehicle 5). In one form, the V2X is a vehicle-to-vehicle communicator including an on-board unit (OBE) having a DSRC radio (a dedicated short range communication (DSRC) radio) to perform the vehicle-to-vehicle (V2V) communications so that the host vehicle 3 receives driving information (e.g., a speed, a location, an acceleration/deceleration etc.) of a remote vehicle (e.g., the target vehicle 5) in a basic safety message (BSM) format. In another form, the host vehicle may receive such traffic information and driving information by utilizing V2I (Vehicle to Infrastructure) communication technologies. Upon receipt of the traffic and/or driving information of the target vehicle 5, the launch profile generator 10 may calculate the target torque profile, and/or target speed profile of the host vehicle to perform the adaptive cruise control to follow the target vehicle. In calculating the target torque profile, and/or target speed profile, the launch profile generator 10 also uses the internal driving information (e.g., acceleration pedal input, brake pedal input, steering angle input, road grade information etc.) of the host vehicle 3 as well as road condition of a road on which the host vehicle travels. The road condition information may be provided the host vehicle through the V2X communication or calculated based on information from the image sensor 36 or the internal driving information of the host vehicle.

In order to provide such driving condition information of the host vehicle 3 and the road, the control system 1 may include: a road grade sensor 44 to measure a road grade value of a road on which the host and target vehicles travel; a steering angular position sensor 46 to detect steering angles of a steering wheel of the host vehicle 3; a brake pedal position sensor 48 to detect a degree of a brake pedal operation; and an acceleration pedal sensor 50 to detect a degree of an acceleration pedal operation. The sensors listed above are exemplary forms and other sensors known to those skilled in the art may be used to detect further driving related information.

The launch profile generator 10 receives the monitored vehicle driving conditions and may calculate a distance between the host vehicle 3 and the target vehicle 5 or a relative speed between the host vehicle and the target vehicle such that the launch profile generator 10 generates a target torque profile, or a target speed profile of the host vehicle based on the calculated distance and relative speed between the host vehicle and target vehicle.

For example, in order to generate a desired speed profile (i.e., the target speed profile), a nominal launch speed profile is first defined based on following factors: i) vehicle acceleration characteristics considering available engine torques, gear ratios, and acceleration capacity; and b) an acceptable level of acceleration and jerk (i.e., change of acceleration per unit time) for a nominal driver. The nominal speed profile can be derived from actual vehicle drivability test data, and multiple nominal speed profiles can be created and applied for different drive modes (e.g. "Eco", "Comfort", or "Sport" mode). Once, the nominal speed profile(s) is defined, the nominal speed profile is adjusted within a certain boundary in a way that the distance to the preceding vehicle is matched with a desired distance as close as possible.

In more details, a minimum adjustment boundary and a maximum adjustment boundary can be determined by following factors: i) a road speed limit (if can be known or detected); and ii) a maximum allowable acceleration and a maximum allowable deceleration in order to avoid driver's discomfort—this limitation can also consider fuel efficiency. In addition, the desired distance to a preceding vehicle is given as a function of current vehicle speed (e.g. d=a*v^2+b*v+c, where "d" is a desired distance to a preceding vehicle, "v" is a speed of a host vehicle, and "a", "b" and "c" are parameters) considering the following factors: i) a braking distance to a current position of the preceding vehicle, and ii) a system reaction time (e.g., a delay). In one form, a closed-loop controller can be applied to adjust speed profile to reduce an error (e=desired distance−current distance) within the limitations described above.

In one form, the controller 2 may include a microprocessor configured to control a speed and an acceleration of the host vehicle 3 to launch and follow the target vehicle 5 based on a distance between the host and target vehicle and/or a relative speed between the two vehicles 3, 5. The distance and the relative speed may be determined based on the information received through the radar sensor 34 and the image sensor 36. The radar sensor 34 may be a laser radar or a millimeter wave radar. The radar sensor 34 emits a radio beam or a laser light, which is reflected by an object such as a target vehicle, and measures a time required for the beam until coming back to the radar sensor. Based on the measured time, the launch profile generator 10 may calculate the distance up to the target vehicle having reflected the beam and also a relative speed between the two vehicles 3, 5. In another form, the distance and relative speed between the host vehicle 3 and target vehicle 5 may be calculated based on the position information received from the GPS receiver of the GPS unit 38 or via the V2X communicator 42.

As traffic density can be assessed using the V2X communications and/or the information of GPS location communicated among the vehicles, and the average distances between vehicles can be estimated based on the geographic location provided by the GPS sensor or the V2X communication. In one form, a map system can be used to check if the location of the target vehicle is along the same route or the same lane as the host vehicle by comparing the received geographic locations of the target vehicle with map data. With this geographical location information, the relative speed of and the distance between the host vehicle 3 and the target vehicle 5 may be determined based on the geographic location.

In another form of the present disclosure, the vehicle travel control system 1 may include a braking profile generator to control a speed and timing to stop the host vehicle. In one form, the launch profile generator 10 and the braking profile generator 20 (collectively "a profile generator") may be implemented in one processor.

An exemplary form of how to follow a target vehicle is further described in the followings. When a driver of the host vehicle 3 turns on the ACC function to follow the target vehicle 5 with a pre-set distance, the profile generator (e.g., the launch profile generator 10, the braking profile generator 20) can generate a speed profile, namely a set of speed values pertaining to a moment in time (e.g., a time index) and then the controller 2 of the host vehicle 3 issues acceleration pedal commands for acceleration to an acceleration pedal commander 12 or brake pedal commands to decelerate the host vehicle to a brake pedal commander 22 in order to have the host vehicle to follow the speeds as set in the speed profile. In another form, the profile generator generates a torque profile (by the launch profile generator 10) to accelerate (i.e., increase the speed) the host vehicle or the brake pressure profile (by the braking profile generator 20) to decelerate (i.e., decrease the speed) the vehicle to follows the target vehicle while maintaining a pre-set distance or speed.

The controller 2 may be electrically connected with the profile generator 10, 20 and the memory 16 and read data stored in the memory 16 to output a control command corresponding to the received target torque profile, braking pressure profile, or target speed profile from the profile generator 10, 20. For example, the controller 2 may output, based on the profiles from the launch profile generator 10, a virtual accelerator pedal position that mimics a human driver's accelerator pedal action when the host vehicles launches, or a throttle opening command in case of a gasoline engine based on the calculation of required torque for launch. For vehicles equipped with diesel engines, a fuel injection command can be used instead of the throttle command. The control command from the controller 2 is delivered to the fuel controller 14. The fuel controller 14 may be a throttle valve controller for a gasoline engine, an injection valve controller for a diesel engine, or an electricity controller for an electric vehicle. The amount of accelerator pedal position or desired engine torque is eventually translated to the amount of acceleration to have the host vehicle reach at the target speed.

Figure 8:
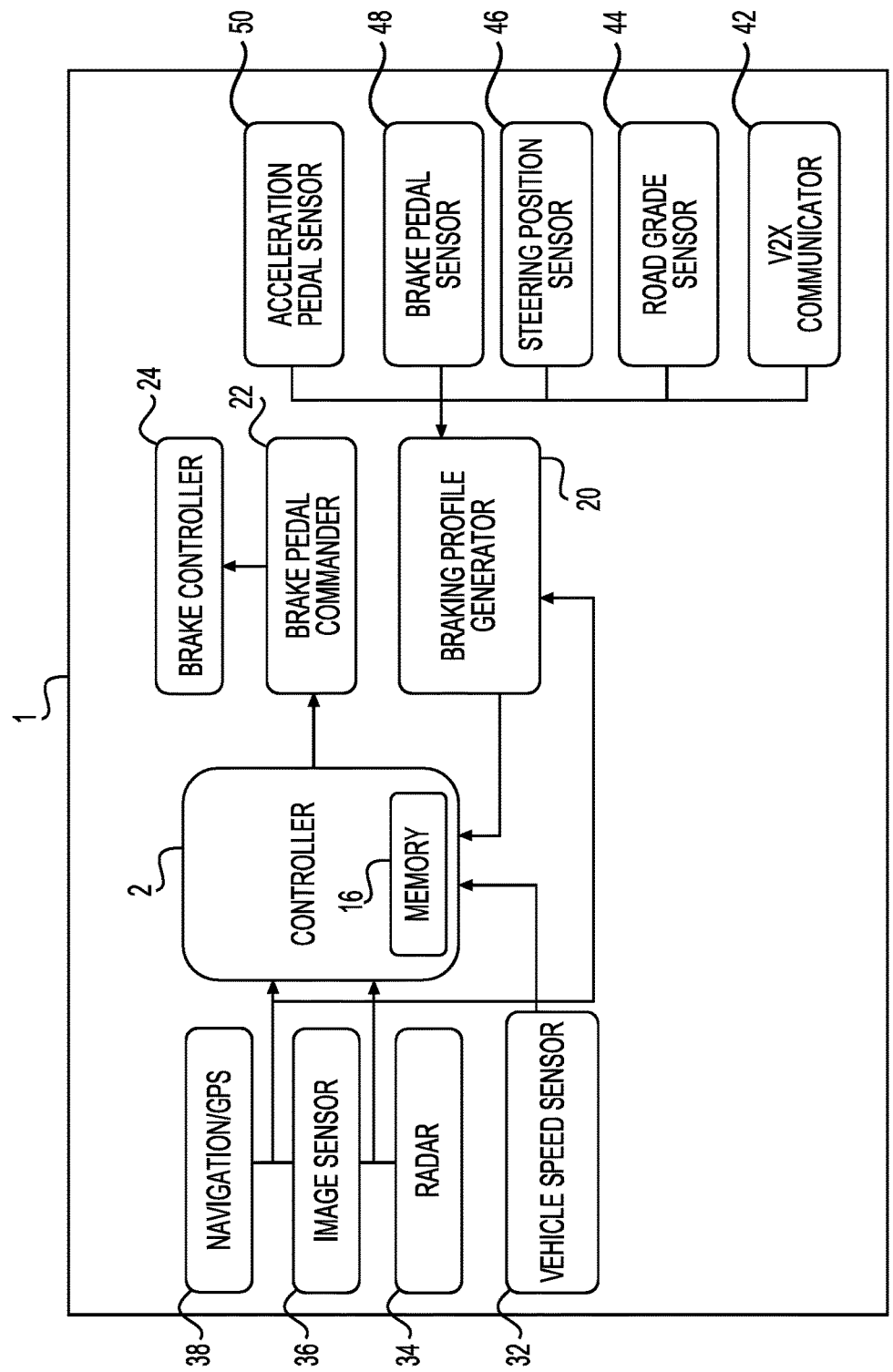
FIG. 8 is a block diagram illustrating components of a vehicle travel control system for a vehicle in another form.

In another travel scenario, the host vehicle 3 may travel under the adaptive cruise control to follow the target vehicle and the controlled host vehicle 3 needs to stop for a stopping or already stopped target vehicle 5 ahead. As illustrated in FIG. 8, the controller 2 then receives a brake pressure profile or a target speed profile from the braking profile generator 20 calculated based on driving information monitored by the various sensors (32, 34, 36, 38, 42, 44, 46, 48, 50). Then, depending on the brake control system configuration, the controller 2 may calculate either one of the following commands for decelerating and stopping the vehicle 3: i) brake pedal position commands for the brake pedal commander 22 that converts the brake pedal position commands into desired brake pressures, or ii) desired pressure values for the brake controller 24. In the calculation for braking, controller 2 may consider a current speed of the vehicles 3, 5 and a distance left to the target vehicle 5 using sensors (e.g., image sensor 36 and radar 34). The controller 2 can also consider the information of a relative speed to the target vehicle based on monitored driving conditions.

When the host vehicle 3 follows the target vehicle 5 without a stop or a rapid speed change, the host vehicle 3 would not confront a situation requiring a rapid change to the speed to follow the target vehicle such that the driver of the host vehicle 3 may not need to operate an acceleration pedal or a brake pedal to terminate the ACC function for a desired speed. However, a drive of a vehicle may frequently operate an acceleration pedal or a brake pedal to terminate the ACC function based on the driver's driving preference when the vehicle needs to stop and launch.

For example, when a vehicle stops at an intersection, a driver may prefer to start braking earlier than other drivers for smooth stop and safety concern such that even if the vehicle travels with a set speed under the ACC function. That is, the driver may brake the vehicle to slow down the vehicle earlier than a programmed brake operation time according to a brake pressure profile.

Similarly, when a vehicle launches after a stop, the launching speed and torque of the vehicle as programed in the speed or torque profiles may not meet with the driver's driving preference so that the driver may operate an acceleration pedal of the vehicle to accelerate the vehicle earlier than the programmed acceleration timing in the speed or torque profiles.

In general, operating either a brake pedal or an acceleration pedal terminates the ACC function and thus a driver needs to turn on the ACC function as desired. According to exemplary forms of the present disclosure, a target speed, torque and/or brake pressure profiles can be revised based on a driver's preference, which is determined by learning the records of acceleration and braking of the vehicle such that the vehicle provides customized profiles according to the driver's preferences in driving the vehicle.

Figure 4:
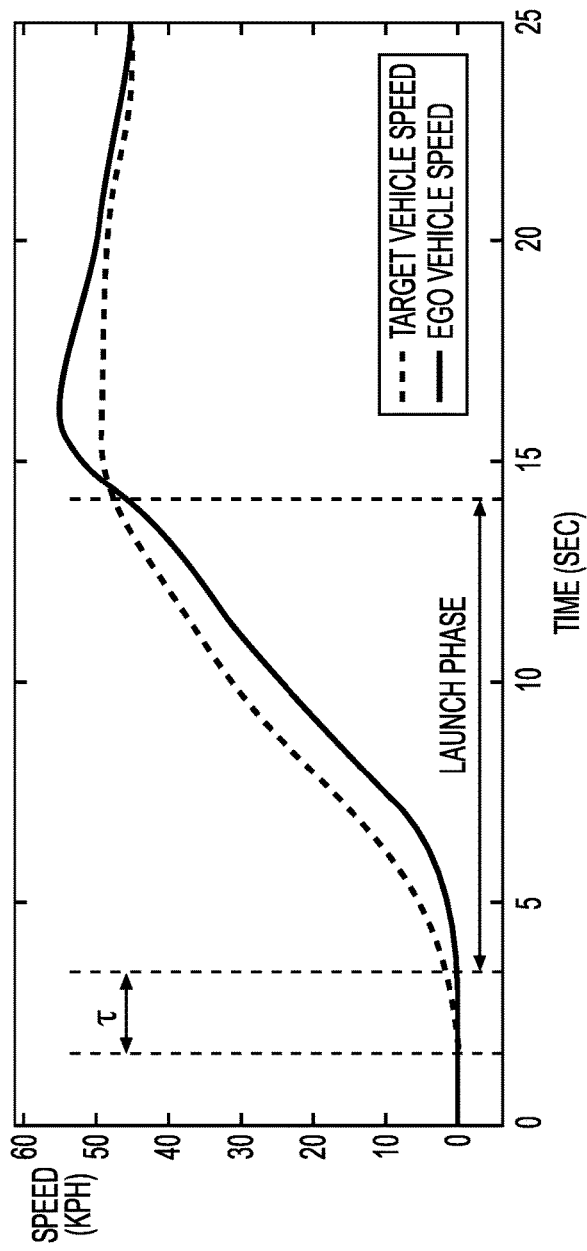
FIG. 4 are graphs respectively illustrating speeds of a host vehicle and a target vehicle when both vehicles launch after stop.
Figure 5:
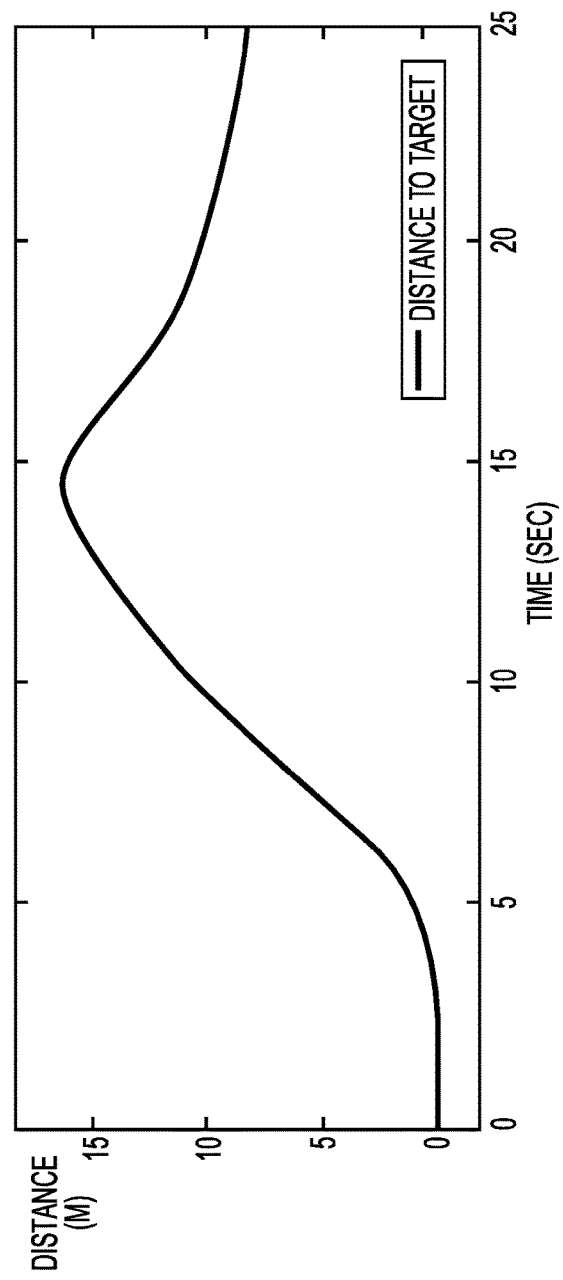
FIG. 5 is a graph illustrating a distance between a host vehicle and a target vehicle.

FIG. 4 shows graphs respectively illustrating speeds (kilometer per hour "kph") of a host vehicle and a target vehicle when both vehicles launch after stop and the host vehicle is controlled with a target speed profile to follow the target vehicle under an adaptive cruise control (ACC) mode before the target speed profile is revised. FIG. 5 is a graph illustrating a distance ("m") between a host vehicle and a target vehicle when the host vehicle launches based on the target speed profile in FIG. 5.

As illustrated in FIG. 4, there is a time delay "τ" defined by a time period between an initial movement of an ego-vehicle (i.e., host vehicle) and an initial movement of the target vehicle after the vehicles stopped, and "the launch phase" refers to a time period measured from a moment of initial movement of the host vehicle until the end of acceleration of the target vehicle, namely entering into a speed stable state, when the host vehicle starts to move in the ACC driving mode to follow the target vehicle. In general, due to the time delay "τ" and different speed profiles between the host and target vehicles during the launch phase, a speed gap and a distance gap between the host vehicle and the target vehicle become greater than a speed gap and a distance gap in a normal cruise driving condition where the host vehicle runs with a constant speed. If those gaps go beyond the driver's expectation, the driver of the host vehicle 3 probably operates the acceleration pedal to catch the speed of the target vehicle or maintain the desired distance to the target vehicle.

FIG. 5 illustrates that the distance gap between the two vehicles (i.e., "Distance to Target") goes beyond a preset distance (e.g., 8 m at the ending time in FIG. 5) so that the following behavior of the host vehicle after launch (namely, launch-follow behavior) is undermined so that the driver of the host vehicle may not satisfy with the ACC function. To narrow those gaps (distance gap and speed gap), we have discovered that it is important how to control the speed and acceleration of the host vehicle during "the launch phase" to comply with the driver's driving pattern.

Figure 10:
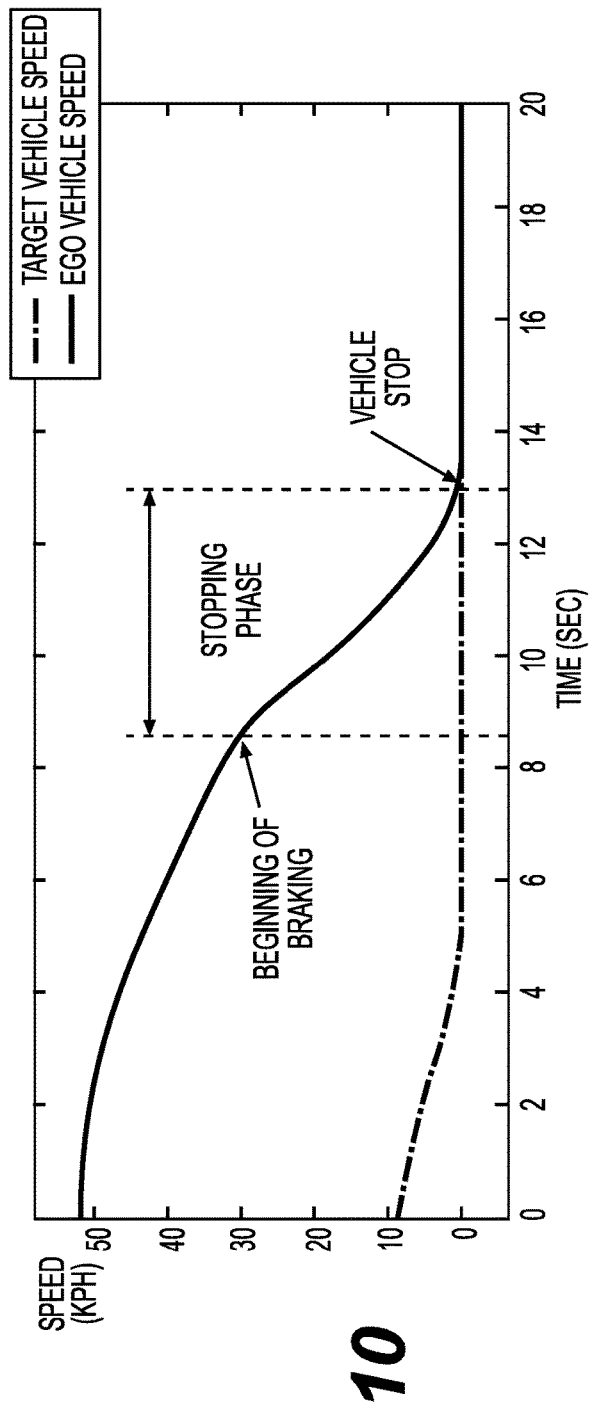
FIG. 10 are graphs respectively illustrating speeds of a host vehicle and a target vehicle when both vehicles brake to stop.
Figure 11:
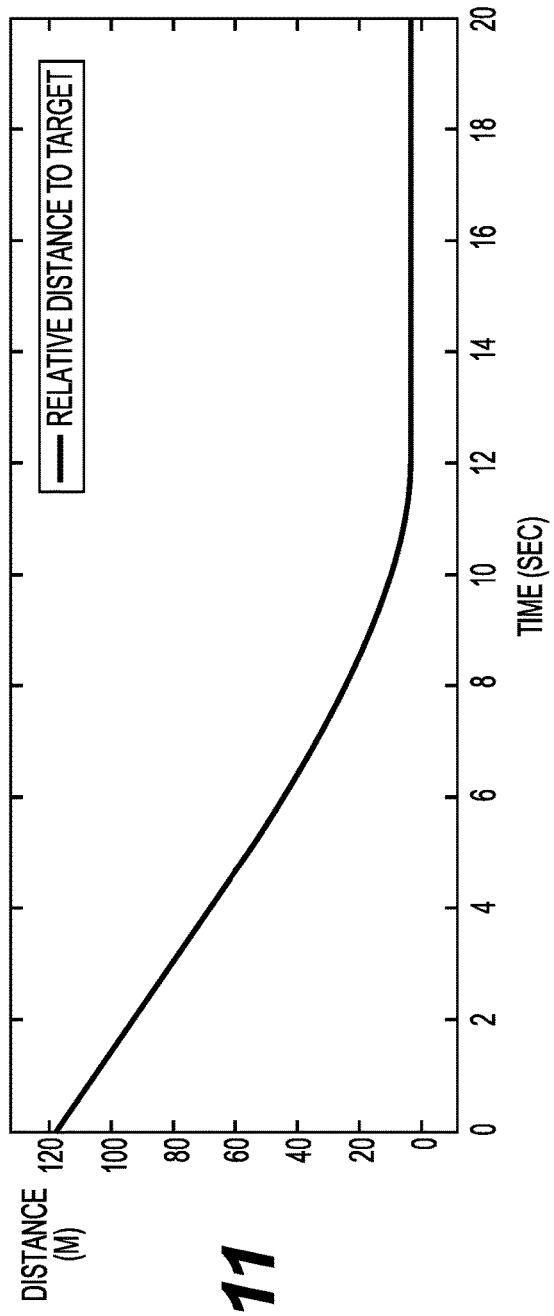
FIG. 11 is a graph illustrating a distance between a host vehicle and a target vehicle during the host vehicle brakes to stop.

FIG. 10 are graphs respectively illustrating speeds (kilometer per hour "kph") of the host vehicle (i.e., Ego vehicle speed in FIG. 10) and the target vehicle (i.e., "Target vehicle speed"), when both vehicles brake to stop, namely braking-to-stop behavior, when the host vehicle travels under the ACC mode before a braking pressure profile is revised. FIG. 11 is a graph illustrating a distance ("m") between the host vehicle and the target vehicle ("Relative distance to target" in FIG. 11) during the host vehicle brakes to stop based on the target speed profile, or the braking pressure profile in FIG. 10.

FIG. 10 also illustrates the beginning of braking the host vehicle, and "a stopping phase" that is a period starting from the beginning of braking until the host vehicle stops. Even though the start of braking timing of the host vehicle 3 may be a function of various factors such as current speeds of the host and target vehicles, and the relative distance from the host vehicle to the target vehicle, or a stopped traffic object ahead etc., the controlled braking-to-stop behavior of the host vehicle is mainly determined by the moment of initial brake timing and the speed profile (or the brake pressure profile) until the host vehicle stops. The speed profile in FIG. 10 may not apply if the host vehicle needs to reaccelerate in the middle of the braking process upon traffic condition change. This case means an abortion of the stopping process.

In one form of the present disclosure, the vehicle travel control system 1 is configured to revise a target torque profile, a braking pressure profile, or a target speed profile of the host vehicle based on preferences of its driver. Exemplary forms will be described in detail below.

While the host vehicle 3 travels according to speed or torque values determined based on at least one of the target torque profile or target speed profile, the driver of the host vehicle 3 may manipulate an acceleration pedal or a brake pedal to accelerate or decelerate the vehicle. An acceleration pedal sensor 50 and a brake pedal sensor 48 detect the degree of the acceleration and deceleration (i.e., braking) and send detected values to the memory 16 where the detected values are stored. This monitoring process of the driver's operation may continue regardless of operation of the ACC function. In one form, the stored data may be a form of a graph or a table showing the detected values with respect to each time of detection.

Figure 3:
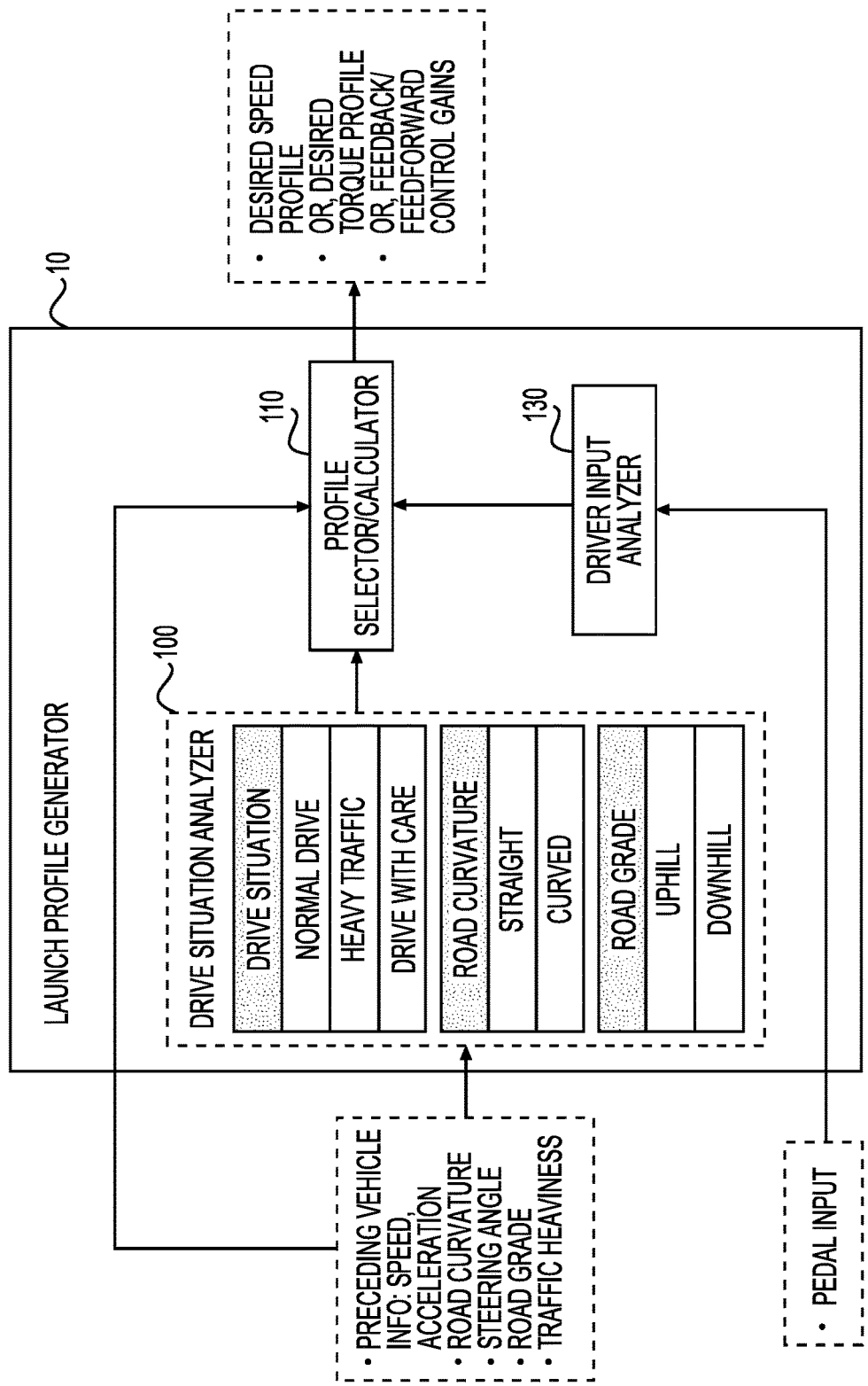
FIG. 3 is a block diagram illustrating components of a launch profile generator.
Figure 9:
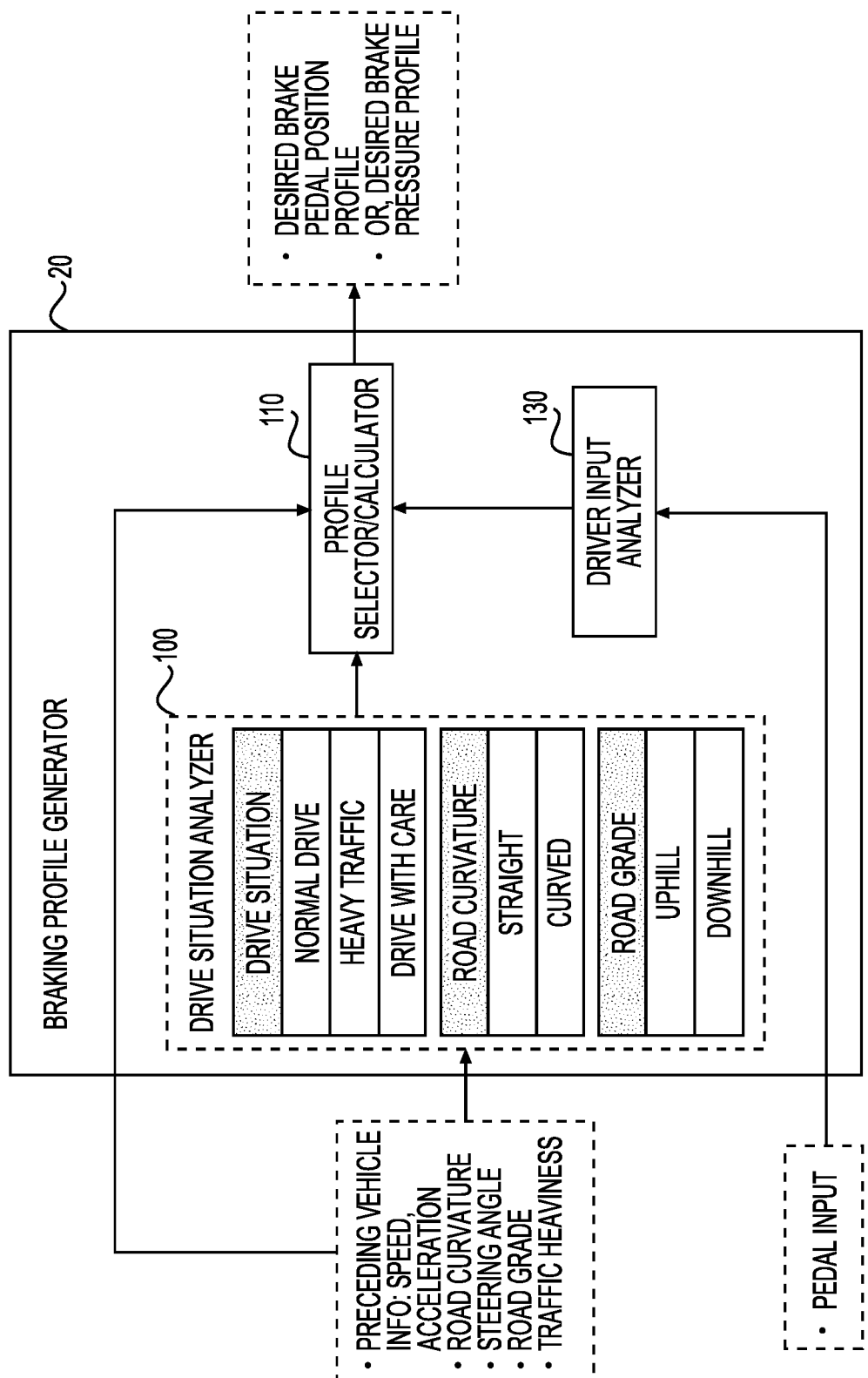
FIG. 9 is a block diagram illustrating components of a braking profile generator.

In one form, with reference to FIGS. 3 and 9, the launch profile generator 10 includes a driver input analyzer 130 configured to analyze an intention of the driver of the host vehicle 3 when the driver operates the accelerator pedal or the braking pedal during the ACC driving so as to decrease or increase the speed of the host vehicle. For example, if the driver of the host vehicle 3 presses the accelerator pedal when the host vehicle launches after a stop at an intersection, the acceleration pedal sensor 50 detects the degree of the acceleration and sends corresponding signals to the memory 16 where the detected acceleration values are stored. Similarly, the brake pedal position sensor 48 may detect a degree of the brake pedal operation pressed by the driver and send the corresponding signals to the braking profile generator (i.e., the driver input analyzer 130). The driver input analyzer 130 may read the received acceleration and/or deceleration data to determine whether the intervention was transitory for the traffic situation at the moment of the operation or was a result of driver's consistent discomfort against the controlled launch behavior or the braking behavior.

Here, the driver input analyzer 130 may be a software or a hardware (e.g., a microprocessor) to execute a set of instructions stored in a memory. Since the stored data include each of acceleration values (or speed values) and the brake pedal position values (or braking pressure values) pertaining to a moment in time, the driver input analyzer 130 may compare the recent values with past values and determine whether the acceleration and deceleration situations repeat under a certain situation, for example, the launch and follow situation after a stop at an intersection, or temporary acceleration and deceleration due to traffic on a road by combining monitored driving conditions received from the GPS unit 38, image sensor 36, and/or V2X communicator 42 etc. Such situation may be a braking to stop situation where the host vehicle follows the target vehicle and needs to stop at an intersection or the like.

When the driver input analyzer 130 determines that the action of intervention by the driver repeats under a certain situation and thus is due to the driver's preference, the driver input analyzer 130 sends the pedal inputs received from the acceleration pedal sensor 50 (or the brake pedal position sensor 48) to the profile select/calculator 110. And then, the profile select/calculator 110 may revise at least one of the generated target torque profile, target speed profile, or braking pressure profile based on the received pedal inputs so as to apply it to the next event of the similar driving condition such that the controlled driving characteristics are customized according to the deriver's driving style. For example, the profile select/calculator 110 may replace previously set speed values (or torque values) with new speed values (or new torque values) detected at the time of the driver's operation so that the target speed or torque profile becomes a revised profile plotted with the new speed or torque values so that the host vehicle 3 travels according to the revised profile when the ACC function works. In one form, the values to update the profile (e.g., the speed profile) may be limited to predefined values for safety concerns (e.g., a speed limit). In controlling the speed and acceleration of the host vehicle, the GPS unit 38 may provide a speed limit information to the host vehicle so that the target torque for launching the host vehicle after stop or the target speed of the host vehicle is revised not to go above the speed limit.

Figure 6:
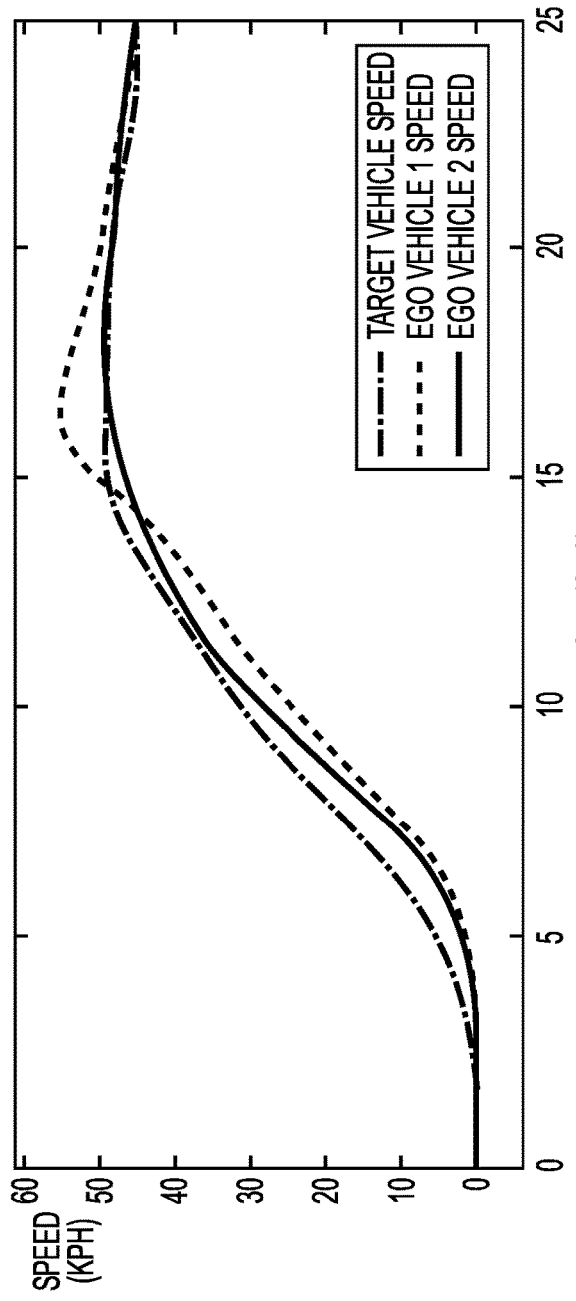
FIG. 6 are graphs respectively illustrating a speed of a target vehicle, and speeds of a host vehicle before and after a speed profile is revised.
Figure 7:
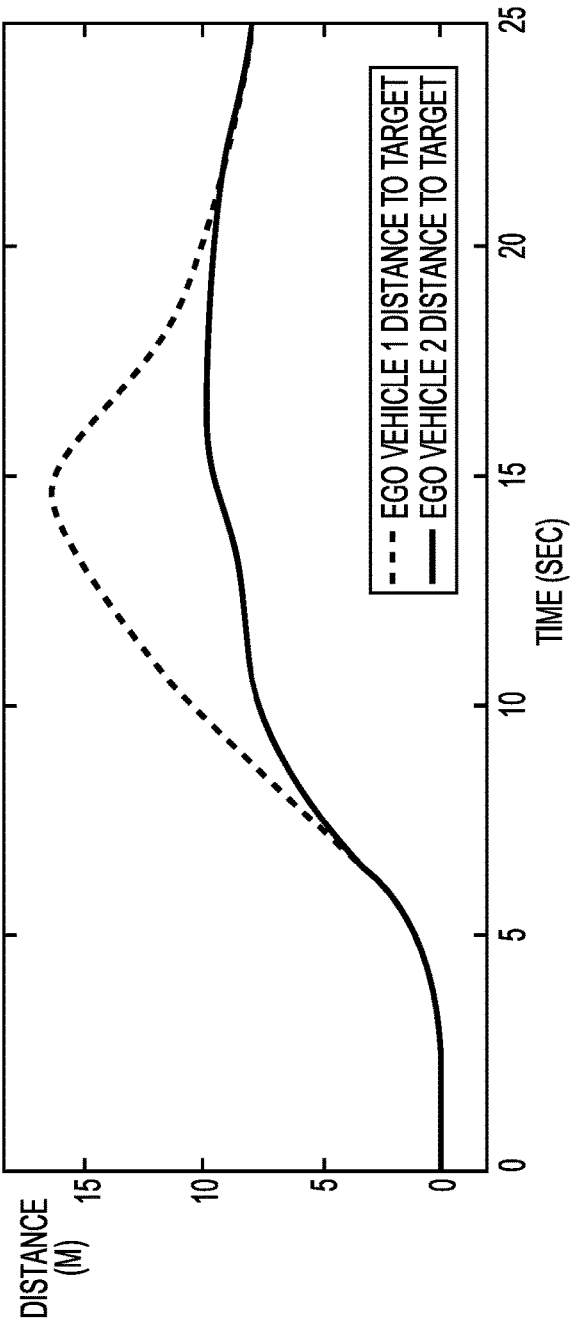
FIG. 7 are graphs respectively illustrating a distance from a host vehicle to a target vehicle before and after a speed profile is revised.

Vehicle launch behaviors before and after the speed profile adjustment are illustrated with reference to FIGS. 6 and 7. FIG. 6 shows graphs respectively illustrating a speed of the target vehicle ("Target Vehicle Speed"), a speed of the host vehicle before the speed profile is revised ("Ego Vehicle 1 Speed"), and a speed of the host vehicle after the speed profile is revised ("Ego Vehicle 2 Speed"). FIG. 7 are graphs respectively illustrating a distance from the host vehicle to the target vehicle before the speed profile is revised ("Ego Vehicle 1 Distance to Target"), and the distance after the speed profile is revised ("Ego Vehicle 2 Distance to Target").

As illustrated in FIGS. 6 and 7, even though both profiles (("Ego Vehicle 1 Speed" and ("Ego Vehicle 2 Speed") eventually follow the target vehicle speed profile (("Target Vehicle Speed") in about 8 meters range (i.e., distance between the host vehicle and target vehicle) after about 15 seconds passed, the distance gaps during the launch phase are significantly different. As illustrated in FIG. 6, the speed of the target vehicle 5 enters into a stable state after around 15 seconds from the initial movement, and FIG. 7 shows that the gap between the two graphs (i.e., "Ego Vehicle 1 Distance to Target" and "Ego Vehicle 2 Distance to Target") is the peak at around 15 seconds. In other words, the distance between the host vehicle and target vehicle becomes the maximum distance (i.e., approximately 17 meters) when 15 seconds passed from the initial movement of the host vehicle after stop when the launch is controlled according to the target speed or torque profile. In this situation, the driver of the host vehicle may feel the response of the host vehicle is too sluggish and may operate the acceleration pedal to override the launch control and to request addition torque to follow the target vehicle more quickly.

At the moment of such acceleration pedal operation, the acceleration pedal sensor 50 detects the degree of the acceleration and sends corresponding signals to the memory 16 where the detected acceleration values are stored. The driver input analyzer 130 uses the detected data, timing of the operation, location information, traffic information or the like to determine whether the intervention was transitory for the traffic situation or is a result of driver's consistent discomfort against the controlled launch behavior. For example, while monitoring driver's intervention in the course of automatic and controlled launching, the intervention could be made by pressing a brake pedal. This means that the automatic launching was too aggressive. If an accelerator pedal is pressed, it indicates that the driver felt the launching was too slow. During this process, the distance and relative speed to the preceding vehicle should be examined as well to determine if the intervention was made in response to an unusual movement of the preceding vehicle (e.g. preceding vehicle made an emergency stop). Upon determination of driver's preferences, the profile select/calculator 110 revises at least one of the generated target torque profile or target speed profile based on the received pedal inputs. FIG. 7 illustrates that the revised speed profile improves the launch behavior of the host vehicle in following the target vehicle.

In another form, the profile generator (i.e., the launch and braking profile generators 10, 20) may include a drive situation analyzer 100 to provide the profile selector/calculator 110 with a plurality of pre-stored speed profiles, a plurality of pre-stored braking pressure profiles, or a plurality of pre-stored torque profiles (collectively, "sub-profiles"), which are selected based on various driving conditions such as drive modes (e.g., normal drive mode, heavy traffic, drive with care), road curvature information (e.g., straight road, curved road), and road grade (e.g., uphill road, downhill road) or the like.

The sub-profiles (i.e., the pre-stored speed profiles, braking pressure profiles, or torque profiles) may be: speed values, braking pressure values, or torque values for the normal drive mode; speed values, braking pressure values, or torque values for a straight road; speed values, braking pressure values, or torque values for a downhill road; or any combination of these values, which are selected based on the monitored driving conditions such as vehicle speed inputs, acceleration inputs, steering angle inputs, road grade inputs, traffic information etc. When the profile selector/calculator 110 receives the selected sub-profile(s) from the drive situation analyzer 100, the profile selector/calculator 110 may select a profile among the received sub-profile(s) or combine them to output a speed profile, a braking pressure profile or a torque profile, which is best suitable to the current driving conditions. As discussed above, the profile selector/calculator 110 may also revise the selected sub-profile(s) based on the input from the driver input analyzer 130 so as to provide the controller 2 with desired speed, braking pressure or torque profiles, feedback or feedforward control gains. As described above, the driver input analyzer detects the driver's intervention. When the driver consistently applies brake during automated launch, the analyzer adjusts predefined profiles (i.e., sub-profiles) by reducing the level of acceleration by a predetermined amount. As opposed to that, it increases acceleration when there is an acceleration pedal input.

Figure 12:
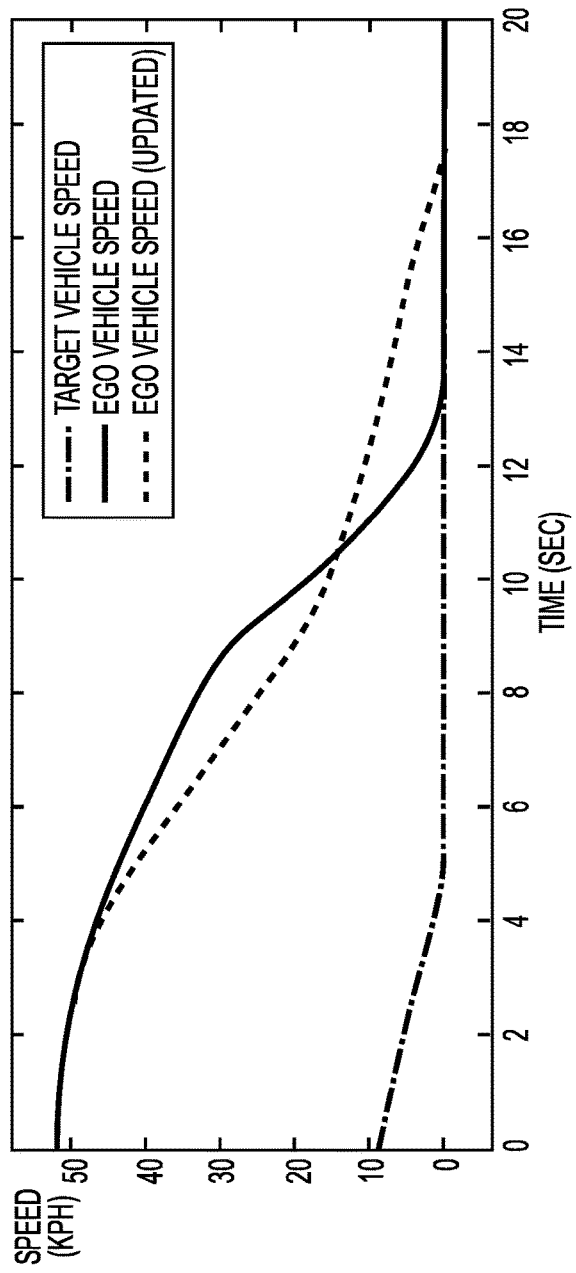
FIG. 12 are graphs respectively illustrating a speed of a target vehicle, a speed of a host vehicle before a braking pressure profile is revised, and a speed of the host vehicle after the braking pressure profile is revised.
Figure 13:
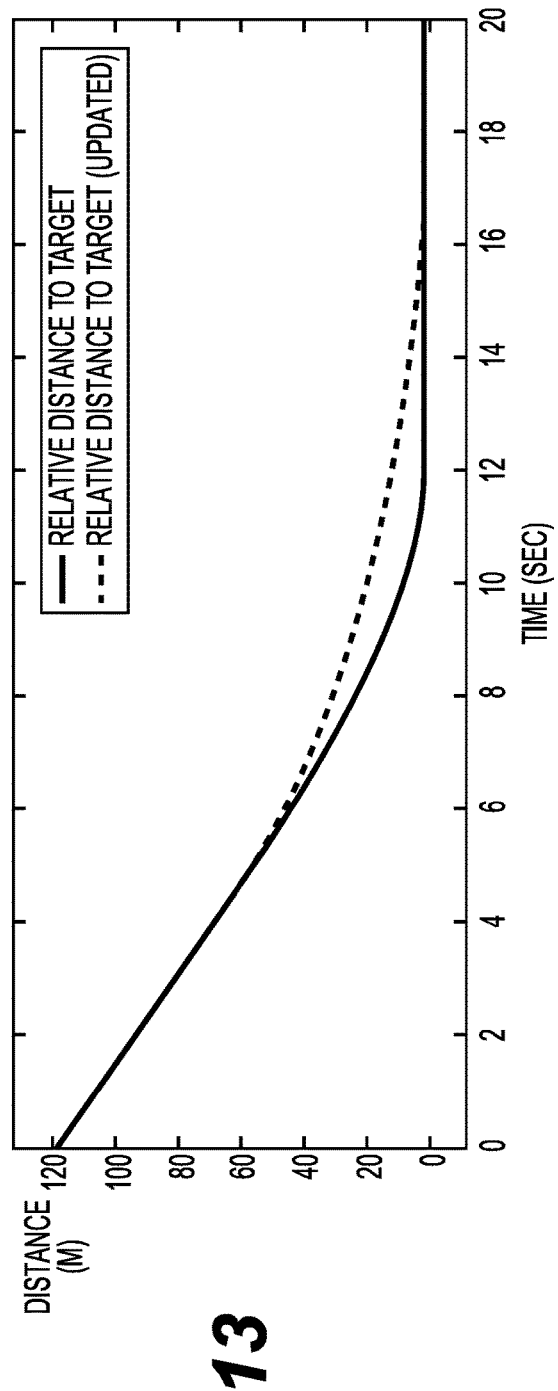
FIG. 13 are graphs respectively illustrating a distance from a host vehicle to a target vehicle before the braking pressure profile is revised, and the distance after the braking pressure profile is revised.

The braking-to-stop behaviors of the host vehicle before and after the braking pressure profile adjustment are illustrated with reference to FIGS. 12 and 13. FIG. 12 shows graphs respectively illustrating a speed of the target vehicle ("Target Vehicle Speed"), a speed of the host vehicle before the braking pressure profile is revised ("Ego Vehicle Speed"), and a speed of the host vehicle after the braking pressure profile is revised ("Ego Vehicle Speed (updated)"). FIG. 13 are graphs respectively illustrating a distance from the host vehicle to the target vehicle before the braking pressure profile is revised ("Relative Distance to Target"), and the distance after the braking pressure profile is revised ("Relative Distance to Target (updated)").

As illustrated in FIGS. 12 and 13, even though both speed profiles ("Ego Vehicle Speed" and "Ego Vehicle Speed (updated)") eventually follow the target vehicle speed profile (("Target Vehicle Speed") and stop in about 2 meters range (See, FIG. 13), the distance gaps during the stopping phase are significantly different. As illustrated in FIG. 12, when the profile 1 (solid curve—"Ego Vehicle Speed") is applied, the driver of the host vehicle 3 may feel the vehicle approaches the target too fast. To override such control action, the driver could press the brake pedal in the middle of the deceleration process to slow down the vehicle. By contrast, as shown in the dotted curve, when the revised profile ("Ego Vehicle Speed (updated)" in FIG. 12) applies, the vehicle under the ACC operates the brake pedal sooner and the deceleration profile becomes much smoother.

Figure 14:
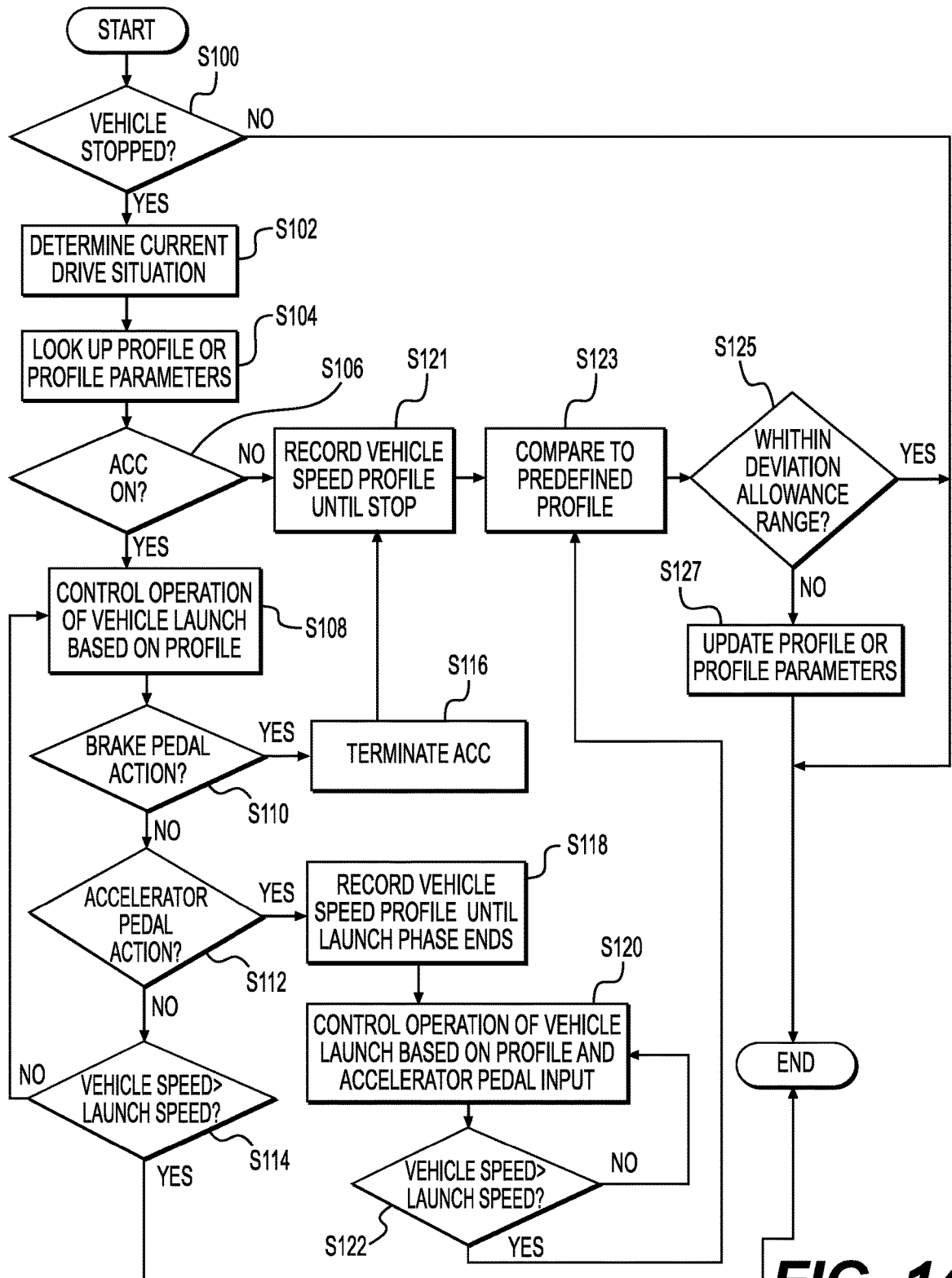
FIG. 14 is a flowchart illustrating a method controlling a launch speed of a vehicle under an adaptive cruise control.

In another form of the present disclosure, a method for controlling driving of a vehicle will be described with reference to FIGS. 14 and 15. FIG. 14 is a flowchart illustrating a method controlling a launch speed of a vehicle under an adaptive cruise control (ACC) which utilizes the V2V and/or V2I (collectively V2X) communication technologies to improve the cruise control performance as one form of the present disclosure. This method also applies to a vehicle driving under a cooperative adaptive cruise control (CACC).

As described above, the various sensors (32, 34, 36, 38, 42, 44, 46, 48, 50) monitor driving conditions of the host vehicle and the target vehicle. here, the driving conditions may include at least one of a distance between the host vehicle and the target vehicle or a relative speed between the host vehicle and the target vehicle. And, based on the monitored driving conditions, the profile generator (e.g., the launch profile generator 10, the braking profile generator 20) generates at least one of a target torque profile, a brake pressure profile or a target speed profile of the host vehicle.

With reference FIG. 14, when the controller 2 of the host vehicle 3 determines that the vehicle 3 stops at S100, the controller 2 determines the current driving situation based on the monitored driving information from the various sensors (S102) and reads profiles or profile parameters (e.g., speed or torque values in time index) at S104. At S106, the controller 2 determines if the ACC function is on or off at S106. When the ACC function is on, the controller 2 controls the launch driving of the host vehicle based on the profile which is a speed or torque profile provided by the launch profile generator 10 at S108. In the following steps S110, the controller checks if a brake pedal action signal is received through the launch profile generator 10. The controller 2 may terminate the ACC function when such brake pedal action signal is received at S116. Even though the ACC function is either terminated at S116 or the ACC is determined as being off at S106, the speed of the host vehicle 3 is continuously stored in the memory 16 until the vehicle 3 makes another stop (S121). This monitoring process of the driver's operation (e.g., braking or accelerating operation) may continue regardless of operation of the ACC function to be used for the driver's preference.

When any brake pedal action signal is not received, the controller 2 moves on to determine whether any acceleration pedal action signal is received through the launch profile generator 10 at S112 and have the memory 16 to store current vehicle speeds or current torques (i.e., current vehicle speed profile, current torque profile) until the launch phase ends (S118). As the current speed or torque corresponding to the acceleration pedal action is received, the controller 2 controls the driving of the host vehicle accordingly (S120) and at the same time compares the current speed or torque with a launch speed or launch torque which is previously determined by the launch profile generator 10 at S122. When it is determined that the current speed or torque is greater than the launch speed or torque, the controller 2 has the launch profile generator 10 to compare the current speed (or torque) profile (i.e., current speed values or current torque values in a time index during the launch phase) with the previously defined speed profile or torque profile at S123 to determine whether the speed deviation between the current speed profile and the predefined speed profile (or a torque deviation between the current torque profile and the predefined torque profile) is within a predetermined allowance range or not (S125). If the speed deviation (or the torque deviation) is greater than the predetermined allowance range, the launch profile generator 10 revises the previously defined speed profile (or the previously defined torque profile) at S127 so that the revised speed or torque profile is stored and used for next launch driving of the host vehicle.

However, when any acceleration pedal action is not detected and the current speed is less than the previously determined launch speed (S114), the controller 2 controls the host vehicle to follow the previously determined launch speed.

Figure 15:
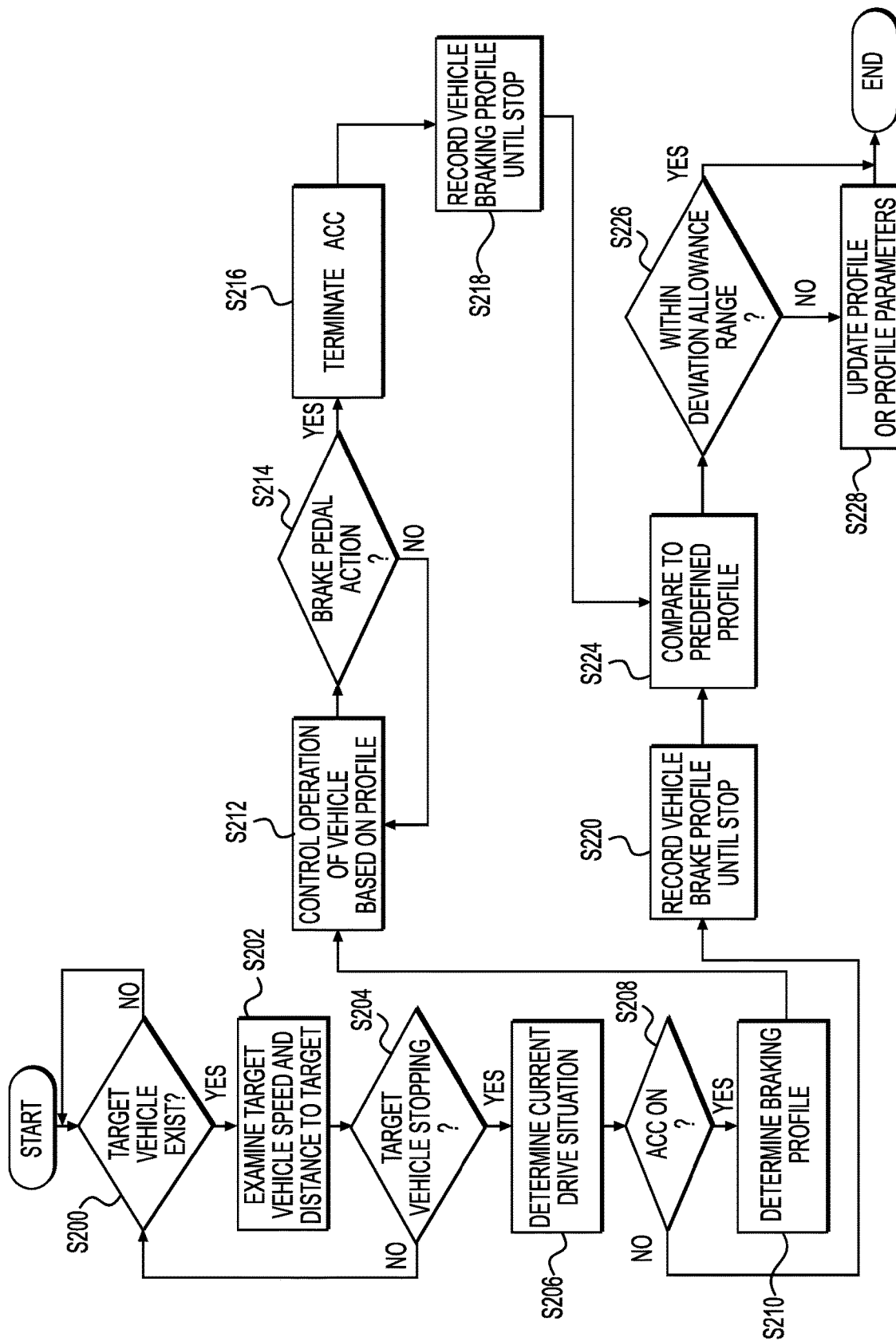
FIG. 15 is a flowchart illustrating a method controlling a braking-to-stop behavior of a host vehicle to follow a target vehicle.

As another form of the present disclosure, FIG. 15 illustrates steps of a method controlling the braking-to-stop behavior of the host vehicle. In particular, when the host vehicle 3 travels in the ACC mode to follow the target vehicle 5 and the driver of the host vehicle 3 operates a brake pedal and thus intervene the stopping phase, the controller 2 may revise the previously defined speed or braking pressure profile based on the input from the brake pedal position sensor 48. The method of controlling the host vehicle is further described below with reference to FIG. 15.

The host vehicle 3 may detect a target vehicle via the image sensor 36, radar 34 or the like at S200, and also detect the speed of the target vehicle 5 and the distance from the host vehicle to the target vehicle (S202). When the target is stopping, the controller 2 of the host vehicle determines the current driving situation based on the inputs from the drive situation analyzer 100 through S204, 206. The controller 2 moves on to the step of determining whether the ACC function is on or not (S208). When the ACC function is on, the braking profile generator 20 generates or selects a speed or braking pressure profile based on the monitored driving conditions as disclosed above. The controller 2 controls the host vehicle based on the generated or selected speed or braking pressure profile (collectively, "braking profile") at S212. During the controlled stopping process, the driver of the host vehicle 3 may operate its braking pedal. If this braking pedal action is detected at S214, the controller 2 terminates the ACC function at S216 and records the braking profile (e.g., speeds or braking pressures in time index) until the host vehicle stops (S218). This recording process to store speeds or braking pressures of the host vehicle is conducted even though the ACC function is off so as to determine the driver's preferred braking characteristic (S220). The stored speed or braking pressure values are compared by the braking profile generator 20 to the set values of the braking profile (i.e., speed or braking pressure values set in the determined speed or braking profile) at S224 so that the braking profile generator 20 determines if the speed or braking pressure value deviation is within a predetermined allowance range or not at S226. If the deviation is greater than the allowance range, the braking profile generator 20 revises the previously defined speed or braking pressure profile based on the stored speeds or braking pressures of the host vehicle (S228) so that the host vehicle performs the braking phase based on the revised profile next time.

In summary, when an brake pedal input is detected, Adaptive Cruise Control (ACC) is automatically terminated and shifts to the manual driving. Then the controller 2 based on a set of instructions (i.e., algorithm) records speed trace of the host vehicle, which is the outcome of the manual driving, and compares the recorded speeds with a predefined speed profile. If the manual driving is significantly deviated from the predefined profile (e.g., beyond a certain bandwidth of +−x % from the predefined profile), then the algorithm adjusts and updates the predetermined profile accordingly. The same process applies when an accelerator pedal input is detected, even though the accelerator pedal press does not deactivate the ACC.

As describe above, the present disclosure enables an intervening action of a user during the adaptive cruise control to be used to improve the controlled driving and thus provides a customized speed and braking performance based on the user's preference.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle travel control system for a vehicle, comprising:
    at least one sensor configured to:
        monitor vehicle driving conditions of a host vehicle and a target vehicle; and
        produce a sensor signal representative of the monitored vehicle driving conditions, the vehicle driving conditions including at least one of a distance between the host vehicle and the target vehicle or a relative speed between the host vehicle and the target vehicle;
    a launch profile generator configured to:
        receive the monitored vehicle driving conditions, and
        generate at least one of a target torque profile, or a target speed profile of the host vehicle based on the monitored vehicle driving conditions; and
    a controller configured to:
        receive at least one of the target torque profile or the target speed profile of the host vehicle from the launch profile generator, and
        control at least one of a speed or an acceleration of the host vehicle based on at least one of the target torque profile or the target speed profile,
    wherein the launch profile generator is further configured to:
        analyze an intention of a driver of the host vehicle when the driver intervenes at least one of the speed or acceleration of the host vehicle being controlled, wherein the intention of the driver is analyzed based on a frequency of the intervention by the driver and corresponding monitored driving conditions received from the at least one sensor, and
        revise at least one of the target torque profile or the target speed profile when the analyzed intention represents preferences of the driver and replace the target torque and target speed profiles with the revised target torque and target speed profiles.

2. The vehicle travel control system of claim 1, wherein the vehicle driving conditions further includes at least one of a speed of the target vehicle, a road curvature and a road grade of a road on which the host vehicle is traveling, traffic information of the road received via vehicle-to-everything (V2X) communicator of the host vehicle, or positions of the host and target vehicles via a global positioning system (GPS) receiver of the host vehicle, and
    wherein the launch profile generator includes:
        a drive situation analyzer configured to provide the launch profile generator with at least one of a pre-stored speed profile or a pre-stored torque profile, based on the monitored vehicle driving conditions.

3. The vehicle travel control system of claim 2, wherein when the launch profile generator receives the at least one of the pre-stored speed profile or pre-stored torque profile, the launch profile generator is configured to generate the target torque profile or the target speed profile based on the at least one of the pre-stored torque profile or the pre-stored speed profile, and the monitored vehicle driving conditions.

4. The vehicle travel control system of claim 2, wherein the launch profile generator includes a driver input analyzer configured to receive a pedal input corresponding to a degree of an acceleration operated by the driver and configured to analyze the intention of the driver based on the received pedal input.

5. The vehicle travel control system of claim 4, wherein the launch profile generator further includes a profile calculator configured to:
    receive the analyzed intention of the driver from the driver input analyzer, and
    revise the at least one of the pre-stored speed profile or the pre-stored torque profile received from the drive situation analyzer based on the analyzed intention of the driver.

6. The vehicle travel control system of claim 1, wherein when the driver intervenes the at least one of the speed or acceleration of the host vehicle, the controller is configured to determine whether an emergency situation of the target vehicle causes the driver intervention based on a change to the at least one of the distance between the host vehicle and the target vehicle or the relative speed therebetween so as to determine whether to revise the at least one of the target torque profile or the target speed profile based on the analyzed intention.

7. A method for controlling driving of a vehicle, the method comprising:
    monitoring, by at least one sensor, driving conditions of a host vehicle and a target vehicle, where the driving conditions includes at least one of a distance between the host vehicle and the target vehicle or a relative speed between the host vehicle and the target vehicle;
    generating, by a launch profile generator, based on driving conditions, at least one of a target torque profile or a target speed profile of the host vehicle;
    controlling, by a controller, at least one of a speed, or an acceleration of the host vehicle based on at least one of the target torque profile, or the target speed profile;
    analyzing, by the launch profile generator, an intention of a driver of the host vehicle when the driver intervenes at least one of the speed or acceleration of the host vehicle being controlled, wherein the intention of the driver is analyzed based on a frequency of the intervention by the driver and corresponding monitored driving conditions received from the at least one sensor;
    revising, by the launch profile generator, at least one of the target torque profile or the target speed profile when the analyzed intention represents preferences of the driver;
    replacing, by the launch profile generator, the target torque and target speed profiles with the revised target torque and target speed profiles; and controlling, by the controller, at least one of the speed or the acceleration of the host vehicle based on at least one of the revised target torque profile or target speed profile.

8. The method of claim 7, wherein the generating at least one of the target torque profile or the target speed profile of the host vehicle, includes:
selecting, by the launch profile generator, at least one sub-profile among stored sub-profiles based on the monitored driving conditions and at least one of a speed of the target vehicle, a road curvature and a road grade of a road on which the host vehicle is traveling, traffic information of the road received via vehicle-to-everything (V2X) communicator of the host vehicle, or positions of the host and target vehicles via a global positioning system (GPS) receiver of the host vehicle.

9. The method of claim 8, wherein the generating at least one of the target torque profile or the target speed profile of the host vehicle, includes:
determining the selected sub-profile as the target torque profile or the target speed profile.

10. The method of claim 8, wherein the generating at least one of the target torque profile or the target speed profile includes: combining a plurality of sub-profiles selected among the stored sub-profiles.

11. The method of claim 7, further comprising:
determining, by the controller, whether the host vehicle starts to move after a stop based on the monitored driving conditions;
determining, by the controller when the host vehicle starts to move after a stop, whether an adaptive cruise control (ACC) function is on;
recording, when the ACC function is off, a speed profile of the host vehicle until the host vehicle makes another stop;
comparing, by the launch profile generator, the recorded speed profile with the target speed profile of the host vehicle; and
revising the target speed profile when a deviation between the recorded speed profile and target speed profile is greater than a predetermined range.

12. The method of claim 7, further comprising:
determining, by the controller, whether the host vehicle starts to move after a stop based on the monitored driving conditions;
determining, by the controller when the host vehicle starts to move after a stop, whether an adaptive cruise control (ACC) function is on;
when the ACC function is on, determining whether an acceleration signal is received;
when the acceleration signal is received, recording a speed profile of the host vehicle until a launch phase of the host vehicle ends;
comparing, by the launch profile generator, the recorded speed profile with the target speed profile of the host vehicle; and
revising the target speed profile when a deviation between the recorded speed profile and target speed profile is greater than a predetermined range.

13. The method of claim 7, further comprising:
determining, by the controller, whether the host vehicle starts to move after a stop based on the monitored driving conditions;
determining, by the controller when the host vehicle starts to move after a stop, whether an adaptive cruise control (ACC) function is on;
when the ACC function is on, controlling the at least one of the speed or acceleration of the host vehicle based on the at least one of the target torque profile or the target speed profile until a brake signal is received;
upon receipt of the brake signal, terminating the ACC function and recording a speed profile of the host vehicle until the host vehicle makes another stop;
comparing, by the launch profile generator, the recorded speed profile with the target speed profile of the host vehicle; and
revising the target speed profile when a deviation between the recorded speed profile and target speed profile is greater than a predetermined range.

14. The method of claim 13, further comprising: when the ACC function is on and the brake signal is not received, determining whether an acceleration signal is received;
upon receipt of the acceleration signal, recording at least one of current speeds or current torques of the host vehicle until a launch phase of the host vehicle ends,
comparing, by the launch profile generator, a recorded current speed or current torque profile with the target speed profile of the host vehicle; and
revising the target speed profile or the target torque profile when a deviation between the recorded current speed profile and the target speed profile or between the recorded current torque profile and the target torque profile is greater than a predetermined range.

* * * * *